E. R. Ferry,
Bridle.
Nº 79,334.  Patented June 30, 1868.
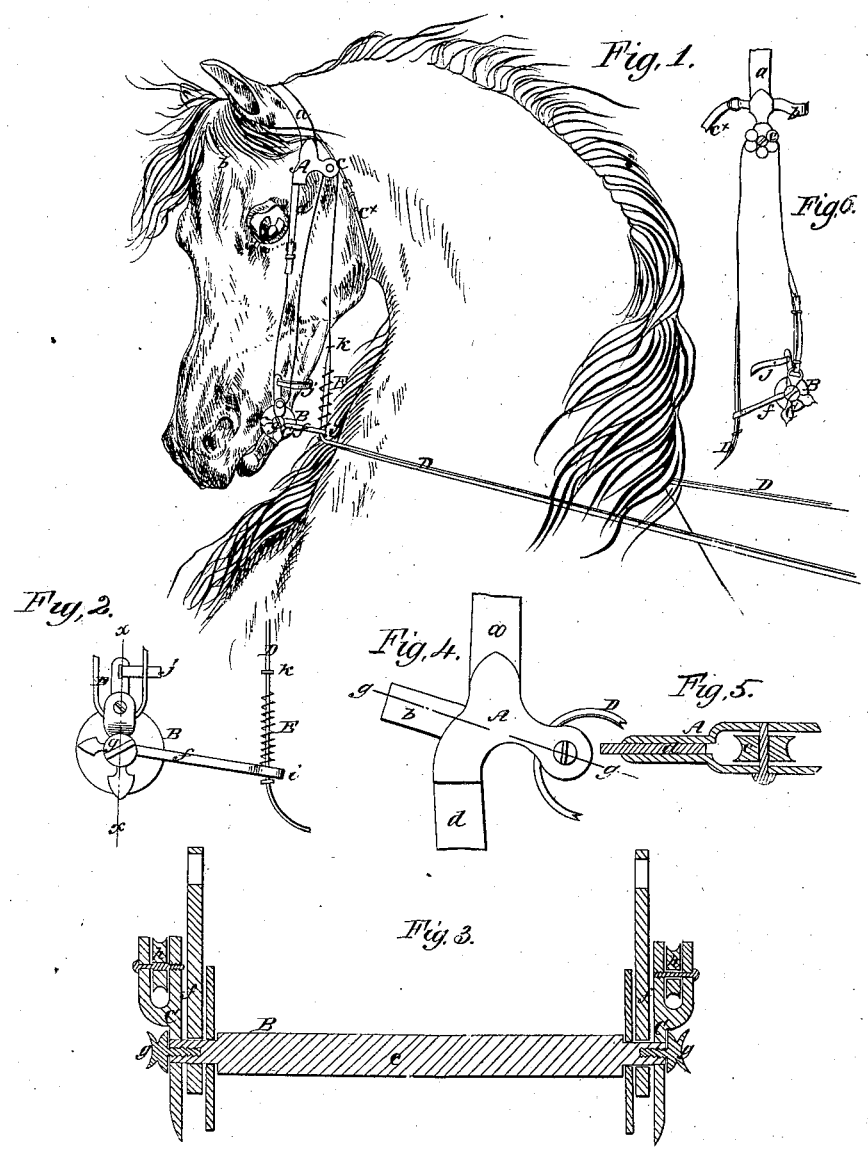
Witnesses.
W. C. Ashkelder
Wm. A. Morgan
Inventor.
E. R. Ferry
per Munn & Co.
attorneys.

United States Patent Office.

E. R. FERRY, OF NEW HAVEN, CONNECTICUT.

Letters Patent No. 79,334, dated June 30, 1868.

IMPROVEMENT IN BRIDLES.

The Schedule referred to in these Letters Patent and making part of the same.

TO ALL WHOM IT MAY CONCERN:

Be it known that I, E. R. FERRY, of New Haven, in the county of New Haven, and State of Connecticut, have invented a new and useful Improvement in Bridles; and I do hereby declare that the following is a full, clear, and exact description thereof, which will enable those skilled in the art to make and use the same, reference being had to the accompanying drawings, forming part of this specification.

This invention relates to a new and useful improvement in bridles, and consists in a novel application of the driving-reins to the same, and in an improved bit-attachment, as hereinafter fully shown and described, whereby the most vicious or badly-frightened horse can be controlled with the greatest facility with a single pair of reins.

In the accompanying sheet of drawings—

Figure 1 is a view of my invention applied to a horse.

Figure 2, an enlarged side view of the bit.

Figure 3, a longitudinal section of fig. 2, taken in the line $x\ x$.

Figure 4, an enlarged side view of a part of the upper portion of the bridle.

Figure 5, a section of fig. 4, taken in the line $y\ y$.

Figure 6, a view of a modification of my improvement.

Similar letters of reference indicate corresponding parts.

The upper part of my improved bridle is composed of the two ordinary straps $a\ b$ and the throat-latch $c^\times$, arranged in the usual way.

At the ends of the straps $a\ b$, where they are connected together, there are secured metal plates A, in which pulleys $c$ are fitted, and to these plates the upper ends of the cheek-straps $d$ are secured, (see figs. 1 and 4.)

B represents the bit of the bridle; $e$ being the bar thereof, on each end of which there is fitted a bent lever, $f$, the latter being allowed to move freely on the bar $e$, or attached permanently thereto, the ends of which pass through the levers at their angles.

On the bar, at each end, and outside of the levers $f$, there are secured, by nuts $g\ g$, bars C C, which are not allowed to turn on the bar $e$.

In the upper ends of the bars C, there are fitted pulleys $h$, one in each.

D D represent the reins, which pass through loops or eyes $i$ at the outer ends of the levers $f$, and extend upward and pass over the pulleys $c$ in the plates A, and thence pass downward and pass under the pulleys $h$ in the bars C, and then pass upward and are connected to the cheek-straps $d$, as shown clearly in fig. 1.

The upper ends of the bent levers $f\ f$ are connected by a strap, $j$, which passes around the under jaw of the horse, and on the reins D D, above the outer ends of the levers $f\ f$, have spiral springs E fitted on them, the lower ends of said springs resting or bearing on the outer parts of the levers $f$, the reins D D, above the springs, having stops $k$ on them,—which, when the reins are drawn in to a certain extent, bear upon and compress the springs E.

The operation is as follows:

On taking up the reins and drawing them gently, the first impression received by the horse is the pressure of the strap $j$ against the lower jaw under the action of the levers $f\ f$.

Under this pressure of the strap $j$, the horse elevates his head in what is commonly termed "style," and superior to that caused by the ordinary curb-bit and check-rein, and without the discomfort which the latter produces.

The springs E, when the stops $k$ are brought in contact with them, resist the pull on the reins, acting similar to a counterpoise, preventing sudden action on the strap $j$, and causing a quick release of the latter when the pull on the reins is slackened.

The bit B, it will be seen, as the reins are pulled, is drawn upward in the mouth of the horse, so that the latter cannot grasp or hold it with his teeth, and, owing to the pulley-arrangement, as shown, a great power or purchase is obtained, and the driver consequently will have complete control over the animal, the springs E operating with respect to the bit in the same way as to the strap $j$, the latter always being acted upon first, and made to bear with a certain degree of pressure against the jaw before the bit B is acted upon, owing to the reins D D passing through the outer ends of the levers $ff$.

In case blinders are not required for the bridle, the cheek-straps $d$ may be dispensed with, and the ends of the reins D D attached to the upper ends of the bars C, the pulleys $c$ being dispensed with, (see fig. 6.)

The same result is attained in this arrangement as in the other.

I claim as new, and desire to secure by Letters Patent—

1. The levers $ff$, fitted loosely on or permanently attached to the bar $e$ of the bit, and having a curb-strap or chain, $j$, attached to their upper ends, in connection with the reins D D, passing through the outer ends of the levers $f$, and passing over pulleys $c$ at the upper part of the bridle, and down to the bit, all arranged to operate in the manner substantially as and for the purpose set forth.

2. The springs E E and stops $k$, applied to the reins D D, in connection with the levers $ff$ and pulleys $cc$ on the bridle, all arranged substantially as and for the purpose specified.

3. The application of the pulleys $c$, with or without the pulleys $h$, in connection with the reins D D, arranged substantially as and for the purpose set forth.

E. R. FERRY.

Witnesses:
  WM. F. McNAMARA,
  ALEX. F. ROBERTS.